United States Patent
Ikeda et al.

(10) Patent No.: US 8,300,346 B2
(45) Date of Patent: Oct. 30, 2012

(54) MICROWAVE ASSISTED MAGNETIC HEAD

(75) Inventors: Hiroshi Ikeda, Tokyo (JP); Isamu Sato, Tokyo (JP); Kiyoshi Noguchi, Tokyo (JP); Tsutomu Aoyama, Tokyo (JP); Takuya Adachi, Tokyo (JP)

(73) Assignee: TDK Corporation, Tokyo (JP)

( * ) Notice: Subject to any disclaimer, the term of this patent is extended or adjusted under 35 U.S.C. 154(b) by 119 days.

(21) Appl. No.: 12/750,870

(22) Filed: Mar. 31, 2010

(65) Prior Publication Data
US 2011/0242696 A1    Oct. 6, 2011

(51) Int. Cl.
G11B 5/02    (2006.01)
G11B 5/127    (2006.01)

(52) U.S. Cl. ............... 360/59; 360/125.31; 360/125.74
(58) Field of Classification Search .................. None
See application file for complete search history.

(56) References Cited

U.S. PATENT DOCUMENTS

| | | | |
|---|---|---|---|
| 2006/0092576 A1* | 5/2006 | Ohtsu | 360/319 |
| 2006/0221499 A1 | 10/2006 | Tagami et al. | |
| 2007/0253106 A1 | 11/2007 | Sato et al. | |
| 2010/0208379 A1* | 8/2010 | Ikeda et al. | 360/59 |
| 2010/0309577 A1* | 12/2010 | Gao et al. | 360/75 |

FOREIGN PATENT DOCUMENTS

| | | |
|---|---|---|
| JP | A-2000-048321 | 2/2000 |
| JP | 2010-186522 A | 8/2010 |

* cited by examiner

*Primary Examiner* — Regina N Holder
(74) *Attorney, Agent, or Firm* — Posz Law Group, PLC

(57) ABSTRACT

A gap between a main pole and auxiliary pole composing a thin film magnetic head having a microwave assisted function of the present invention is filled with a nonmagnetic dielectric layer to embed a microwave radiator. The nonmagnetic dielectric layer has an inclined surface at a end on a side of an opposing medium surface by which the microwave radiated from the microwave radiator to be bent toward the main pole, whereby the microwave magnetic field generated from the microwave generator can be gathered immediately below the main pole, further improving the microwave assisted effect.

27 Claims, 15 Drawing Sheets

MICROWAVE ASSISTED MAGNETIC HEAD

BACKGROUND OF THE INVENTION

1. Field of the Invention

The present invention relates to a thin film magnetic head and magnetic disk device having an alternating-current drive function in a microwave band as an assist method for writing data signals on a magnetic recording medium having a large coercive force for stabilizing magnetization.

2. Description of the Related Art

With advancements in high density recording, bit cells for digital information recorded onto magnetic recording media have become finer. As a result, so-called thermal fluctuation occurs with which signals detected by the reproducing element of a magnetic head fluctuate, whereby the S/N (signal to noise ratio) may deteriorate or signals may even disappear in the worst case.

Therefore, recently, it is supposedly an effective solution to the above problem to increase the perpendicular magnetic anisotropic energy Ku of a recording film in currently used magnetic recording media using perpendicular recording systems. The thermal stability index S corresponding to thermal fluctuation is expressed by Equation 1 below. It is generally considered that the value of S must be 50 or higher.

$$S = Ku \cdot V / kB \cdot T \quad \text{Equation (1)}$$

In Equation (1),
Ku: perpendicular magnetic an isotropic energy;
V: cubic volume of the crystal grains composing the recording film;
kB: Boltzmann constant; and
T: absolute temperature.

According to a so-called Stoner-Wohlfarth model, the anisotropic magnetic field Hk and coercive force Hc of a recording film is expressed by Equation (2). The coercive force Hc is increased as Ku is increased (However, Hk>Hc in conventional recording films).

$$H = Hc = 2Ku/Ms \quad \text{Equation (2)}$$

where Ms is the saturation magnetization of the recording film.

A steep recording magnetic field up to approximately Hk must be applied for magnetization reversal of a recording film corresponding to a desired data series. Magnetic disk devices recently made available for practical use (HDD) using perpendicular recording systems have a recording element utilizing a so-called magnetic monopole, in which a recording magnetic field is applied from the ABS (air bearing surface) to the recording film in its perpendicular direction.

The intensity of the perpendicular recording magnetic field is proportional to the saturation magnetic flux density Bs of the soft magnetic material forming the magnetic monopole. Therefore, materials having a saturation magnetic flux density Bs as high as possible have been developed and are in practical use. However, the saturation magnetic flux density Bs is considered to have a practical upper limit Bs=2.4 T (tesla) from the so-called Slater-Pauling curve and is currently believed to be approaching such a practical limit. The thickness and width of existing magnetic monopoles is approximately 100 to 200 nm. In order to increase the recording density, the thickness and width must be reduced while the generated perpendicular magnetic field tends to be diminished accordingly.

For the above reason, the recording performance of conventional data writing elements is approaching its limit and high density recording has recently become increasingly difficult.

Therefore, so-called thermal assisted magnetic recording (TAMR) is proposed in which the recording film is irradiated and heated with laser light or the like to reduce the coercive force of the recording film before recording signals.

However, the thermal assisted recording has the following problems:

(1) the structure is extremely complicated and expensive as it requires a magnetic head on which a magnetic element and an optical element are mounted; (2) a recording film having largely varied temperature characteristics of the coercive force should be developed; and (3) adjacent track erasing and an unstable recording state occur due to thermal demagnetization during the recording process.

Meanwhile, in accordance with giant magnetoresistive elements (GMR elements) and tunneling magnetoresistance elements (TMR elements) becoming more sensitive, active research has been conducted on spin transfer in electron conduction. Further, a research is conducted to apply the above research to magnetization reversal of the recording film of a magnetic recording medium so that the perpendicular magnetic field necessary for magnetization reversal is reduced. A technical proposal relating to such research is to directly form a microwave generating element as a lamination film between the main pole and auxiliary pole. Then, a high frequency alternating-current magnetic field is applied in the in-plane direction of the magnetic recording medium concurrently with the perpendicular magnetic field.

The frequency of the alternating-current magnetic field applied in the in-plane direction is an ultra high frequency (10 GHz to 30 GHz) in a microwave band that corresponds to the ferromagnetic resonant frequency of recording films. The alternating-current magnetic field applied in the in-plane direction is supposedly able to reduce the required reversal magnetic field in a perpendicular direction to approximately 60% of Hk. If this technology comes into practical use, there will be no need to use the aforementioned complicated HAMR while making it possible to raise the Hk of a recording film, thereby giving rise to the expectation of significant improvement in recording density.

However, in the above proposal, since it is required that a microwave generating element is directly formed as a lamination film between the main pole and auxiliary pole, the manufacturing method is extremely difficult. Therefore, the inventors of the present application have proposed a mechanism in which a microwave excitation current supply circuit is provided outside the magnetic head and a microwave excitation current supplied from the microwave excitation current supply circuit and a direct-current excitation current are guided to a microwave radiator provided in the thin film magnetic head to generate a high frequency magnetic field from the vicinity of the recording part of the thin film magnetic head. In other words, as a microwave radiation means in a microwave assisted magnetic recording system, a waveguide having a planar structure of an inverted microstrip waveguide (I-MLIN) is used to obtain a microwave radiating body having a rectangular cross-section with a preferable aspect ratio (JP Application No. 2009-030937 filed on Feb. 13, 2009).

The invention of the present application further improves the above proposed technology of the inventors of the present application, and aims to further improve the microwave assisted effect by tilting a microwave magnetic field generated from a microwave radiator in an orientation manner directly below the main pole of the writing magnetic pole.

SUMMARY OF THE INVENTION

In order to solve the above problems, the invention of the present application provides a thin film magnetic head provided with a writing magnetic field generation means having a main pole, an auxiliary pole, and a coil wound between the main pole and the auxiliary pole, including a microwave radiator provided between the main pole and auxiliary pole and in the vicinity of an opposing medium surface facing a magnetic recording medium that is a recording target; and a nonmagnetic dielectric layer filling a gap between the main pole and the auxiliary pole to embed the microwave radiator. The nonmagnetic dielectric layer has an inclined surface at an end on a side of the opposing medium surface by which a microwave radiated from the microwave radiator is bent toward a side of the main pole.

In a preferred mode of the thin film magnetic head of the present invention, the microwave radiator is provided separately from the writing magnetic field generation means, and is configured to radiate a microwave band resonant magnetic field by applying a microwave excitation current, the microwave band resonant magnetic field having a frequency equal to or close to a ferromagnetic resonant frequency $F_R$ of the magnetic recording medium that is the recording target.

Furthermore, in a preferred mode of the thin film magnetic head of the present invention, the position where a writing magnetic flux for recording that is radiated from a tip of the main pole by the writing magnetic field generation means reaches the magnetic recording medium that is a recording target is substantially the same as a position where a microwave radiated from the microwave radiator reaches the magnetic recording medium that is the recording target after being bent to the main pole side by the inclined surface.

Furthermore, in a preferred mode of the thin film magnetic head of the present invention, the inclined surface of the nonmagnetic dielectric layer formed at the end on the side of the opposing medium surface is downwardly inclined toward the main pole by an angle θ, and the angle θ is set in a range of approximately 10 to 20° when viewed from a cross-section cut in a perpendicular direction with respect to a track width direction and when the opposing medium surface is disposed to face downwardly.

Furthermore, in a preferred mode of the thin film magnetic head of the present invention, when viewed from a cross-section cut in a perpendicular direction with respect to a track width direction and when the opposing medium surface is disposed to face downwardly, the tip of the main pole main pole is slightly bent toward the auxiliary pole side, and the bending start point is substantially at the same horizontal level as an underside of the microwave radiator.

Furthermore, in a preferred mode of the thin film magnetic head of the present invention, the nonmagnetic dielectric layer is made of a material having a specific dielectric constant of 6 to 9.

Furthermore, in a preferred mode of the thin film magnetic head of the present invention, the nonmagnetic dielectric layer is made of at least one substance selected from the group including alumina, beryllia, mullite, glass, silicon nitride, epoxy, and $SiO_2$.

Furthermore, in a preferred mode of the thin film magnetic head of the present invention, a recess part created for forming the inclined surface of the nonmagnetic dielectric layer at the end on the side of the opposing medium surface is filled with a nonmagnetic filler layer, and the opposing medium surface is flat.

Furthermore, in a preferred mode of the thin film magnetic head of the present invention, a specific dielectric constant of the nonmagnetic filler layer is configured to be smaller than a specific dielectric constant of the nonmagnetic dielectric layer.

Furthermore, in a preferred mode of the thin film magnetic head of the present invention, a tip of the main pole, which is closer to the side of the recording medium, is slightly bent toward the auxiliary pole, and either a bending start point is at the same level as an underside of the microwave radiator, or the underside of the microwave radiator is positioned rearwardly relative to the bending start point.

Furthermore, in a preferred mode of the thin film magnetic head of the present invention, the auxiliary pole is positioned rearwardly relative to the main pole on the opposing medium surface, an underside position of the auxiliary pole is the same as a position where the auxiliary pole and nonmagnetic dielectric layer contact, and the auxiliary pole has no extra protruding portion.

The head gimbal assembly of the present invention includes the above-described thin film magnetic head and is composed of a slider facing a recording medium and a suspension elastically supporting the slider.

The magnetic disk device of the present includes the above-described thin film magnetic head and is composed of a slider facing a recording medium and a positioning device supporting the slider and positioning it relative to the recording medium.

DESCRIPTION OF PREFERRED EMBODIMENTS

Figure 1:
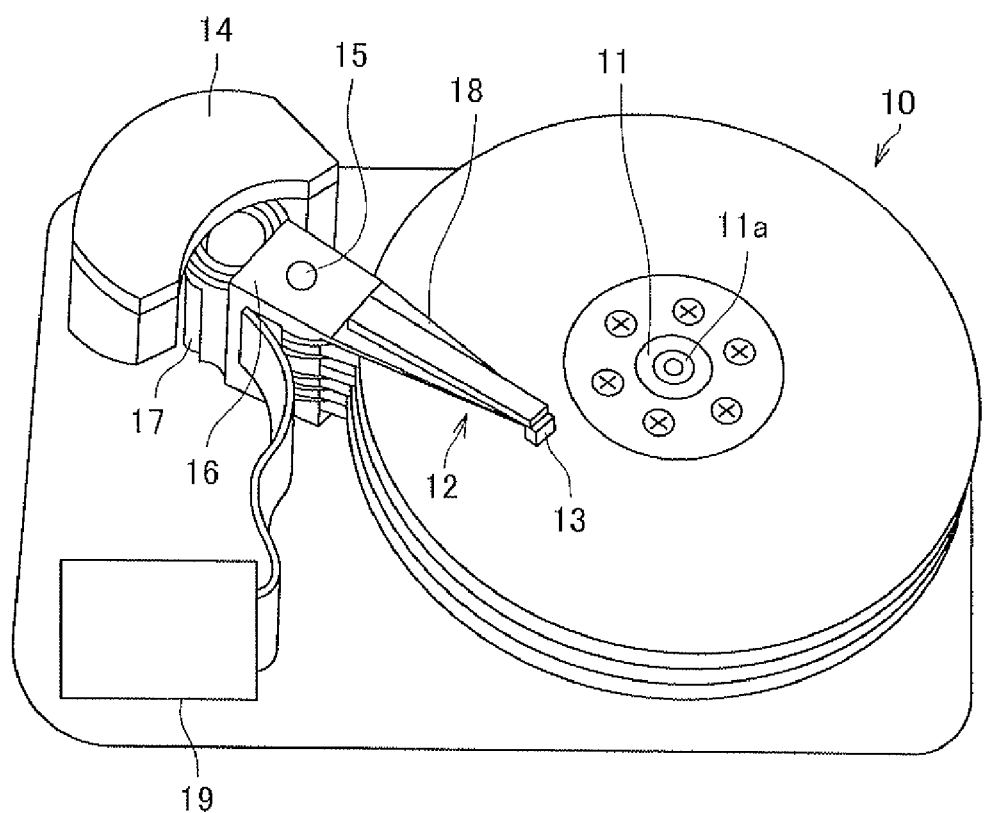
FIG. 1 is a perspective view schematically showing a structure of essential parts in an embodiment of the magnetic disk device (HDD) (same meaning as a magnetic recording and reproducing device) according to the present invention.

Preferred embodiments for implementing the present invention are described in detail hereafter with reference to the drawings. In the drawings, the same components are referred to by the same reference numbers.

The dimensional proportions within a component and between components in the drawings may not be accurate for ease of viewing and are given on an arbitrary basis in each case.

Figure 3:
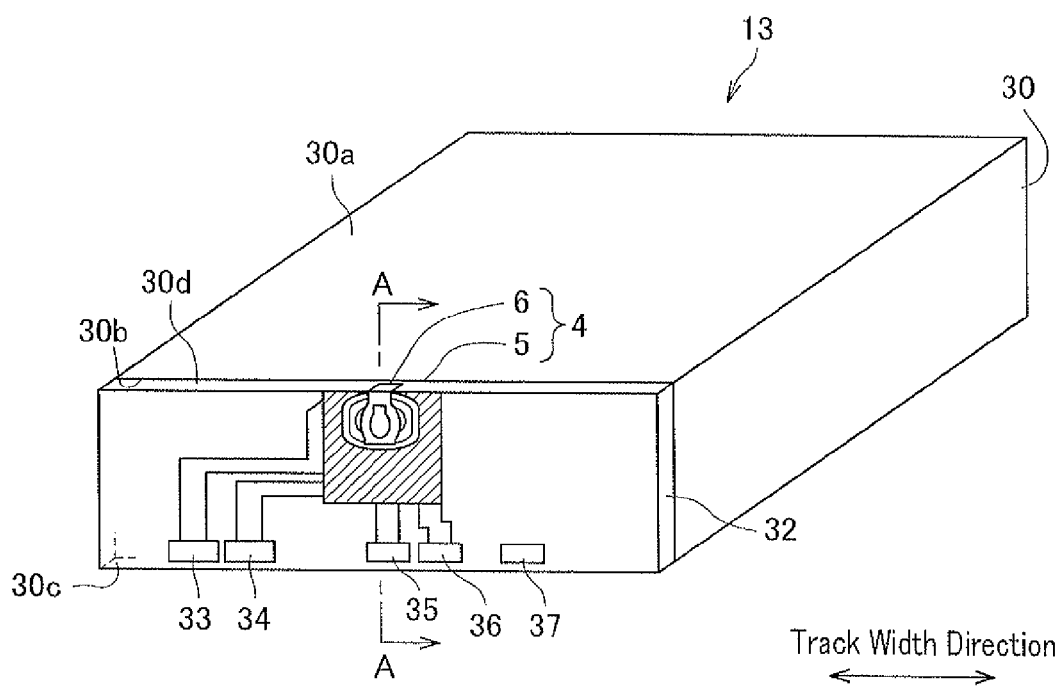
FIG. 3 is a perspective view schematically showing the entire thin film magnetic head 13 in this embodiment.

The X-direction in FIG. 3 and subsequent figures corresponds to a track width direction and the term "width" may be used to refer to a dimension in the X-direction.

The Y-direction in FIG. 3 and subsequent figures corresponds to the depth direction of elements. In the Y-direction, the term "front" may be used to refer to the side closer to the air bearing surface (the surface of a thin film magnetic head that faces the recording medium) and the term "rear" may be used to refer to the opposite side (the side in the back).

The Z-direction in FIG. 3 and subsequent figures corresponds to the direction in which a lamination film is stacked to compose an element, which is the so-called thickness direction. The direction in which a lamination film is stacked is referred to as the "upward" or "upper" side while the opposite direction thereto is referred to as the "downward" or "lower" side.

FIG. 1 is a perspective view schematically showing the structure of the essential parts of an embodiment of the magnetic disk device (HDD) (same meaning as a magnetic recording and reproducing device) of the present invention.

Figure 2:
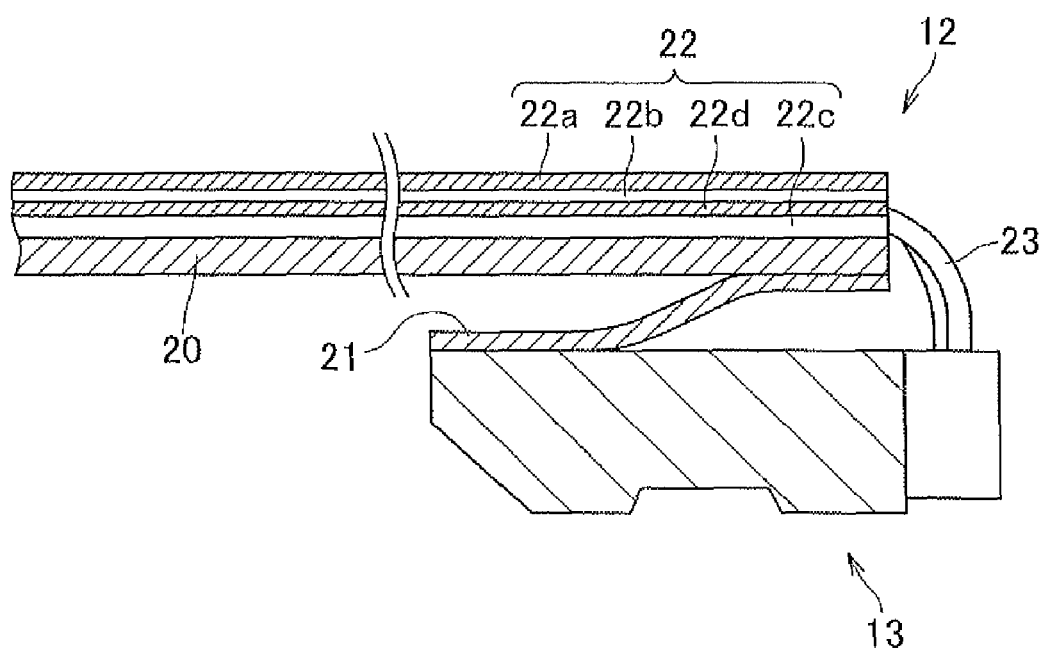
FIG. 2 is a cross-sectional view of a portion of a head gimbal assembly (HGA) in a magnetic disk device of FIG. 1.

FIG. 2 is a cross-sectional view showing a portion of the tip of the head gimbal assembly (HGA) of the magnetic disk device of FIG. 1.

FIG. 1 shows a magnetic disk device. In the figure, the reference number 10 indicates a plurality of magnetic disks 10 that are rotated about a rotation shaft 11a by a spindle motor 11, the reference number 12 indicates a head gimbal assembly (HGA) for properly facing a thin film magnetic head (slider) 13 against the surface of a magnetic disk 10 for reading and writing data signals from and to the magnetic disk 10, and the reference number 14 indicates an assembly carriage device for positioning the magnetic head (slider) 13 on a track of the magnetic disk 10.

The assembly carriage device 14 is primarily composed of a carriage 16 capable of angular pivoting motion about a pivot bearing shaft 15 and, for instance, a voice coil motor (VCM) 17 that angularly pivots the carriage 16.

Bases of multiple drive arms 18 stacked in the direction of the pivot bearing shaft 15 are attached to the carriage 16. The HGA 12 is secured to the tip part of each drive arm 18. Additionally, a magnetic disk device can be provided with a single magnetic disk 10, a single drive arm 18, and a single HGA 12.

The magnetic disk 10 is grounded through the spindle motor number 11 and its rotation shaft 11a.

In FIG. 1, the reference number 19 indicates a control circuit that controls the writing and reading operation of the thin film magnetic head 13 and controls a microwave excitation current for ferromagnetic resonance, described hereafter.

As shown in FIG. 2, the HGA 12 has the thin film magnetic head 13 (slider), a load beam 20 and flexure 21 made of a metal conductive material for supporting the thin film magnetic head 13, and an excitation current wiring member 22 serving as the transmission line for a microwave excitation current and a direct-current excitation current.

Additionally, not-shown head element wiring members are also provided to the HGA 12 for applying writing signals to the writing head element of the thin film magnetic head 13 and for applying a constant current to the reading head element and retrieving a reading output voltage.

The thin film magnetic head 13 is attached to one end of the flexure 21 having elasticity. This flexure 21 and the load beam 20 to which the flexure 21 is attached at the other end compose a suspension supporting the thin film magnetic head 13.

The excitation current wiring member 22 is composed of a strip line having ground conductors at the top and bottom over the greater part of the entire length thereof. In other words, as shown in FIG. 2, a conductor line 22d made of copper (Cu) or the like is interposed between the load beam 20 composing the lower ground conductor and an upper ground conductor 22a via dielectric layers 22b and 22c composed of a dialectic material such as polyimide, respectively.

The excitation current wiring member 22 is formed by the above-described single strip line in parallel with the surface of the load beam 20 (in the case where the microwave circuit has an unbalanced structure). In the embodiment shown in FIG. 2, the tip of the strip line closer to the magnetic head is connected to a terminal electrode by wire bonding using a wire 23.

On the other hand, the not-shown wiring members for the writing head and reading head elements are formed of conventional lead conductors and connected at their tips to terminal electrodes of the writing head and reading head elements, respectively, by wire bonding in this embodiment. Here, the wiring members and terminal electrodes may be connected by ball-bump instead of using wire-bonding. Incidentally, wire bonding is classified into wedge bonding and ball bonding; ball bonding falls under a category of the wire bonding.

FIG. 3 is a perspective view schematically showing the entire thin film magnetic head 13 of this embodiment.

As shown in FIG. 3, the thin film magnetic head 13 includes a slider substrate 30 having an air bearing surface (ABS) 30a tailored to achieve a proper flying height, a magnetic head element 4 provided on an element formation surface 30b that is perpendicular to the ABS 30a and forms a side surface when the ABS 30a forms the bottom surface, an overcoat part 32 provided on the element formation surface 30b in a manner of covering the magnetic head element 4, and five terminal electrodes 33, 34, 35, 36, and 37 exposed from the layer surface of the overcoat part 32.

Here, the magnetic head element 4 has as essential parts a magnetoresistive effect (MR) reading head element 6 for reading data signals from a magnetic disk and an inductive writing head element 5 for writing data signals on a magnetic disk.

The terminal electrodes 33 and 34 are electrically connected to the MR reading head element 6 and the terminal electrodes 35 and 36 are electrically connected to the inductive writing head element 5.

The terminal electrode 37 is electrically connected to one end of a line conductor 38 (FIG. 4) of an inverted microstrip waveguide (I-MLIN), described hereafter. The other end of the line conductor 38 is grounded (in the case of an unbalanced structure).

Here, the positions of the terminal electrodes 33, 34, 35, 36, and 37 are not limited to those shown in FIG. 3 and may be provided at any position on the element formation surface 30b in any arrangement. For example, they may be provided on a slider end surface 30c on the opposite side to the ABS 30a.

Furthermore, when a heater is provided for adjusting the flying height of the thin film magnetic head, a terminal electrode to be electrically connected to such a heater will additionally be provided.

The MR reading head element 6 and inductive writing head element 5 each reach a slider end surface 30d that is on the same side as the ABS 30a at one end. Here, the slider end surface 30d is the surface area other than the ABS 30a on the opposing medium surface of the thin film magnetic head 13 that faces a magnetic disk and is mainly formed by an end surface of the overcoat part 32.

The MR reading head element 6 and inductive writing head element 5 each face the magnetic disk at one end, sensing the signal magnetic field for reading digital signals and applying a signal magnetic field for writing data signals. Here, a coating of an extremely thin diamond like carbon (DLC) or the like may also be provided at one end of each element that reaches the slider end surface 30d and the vicinity thereof for the purpose of protection.

Figure 4:
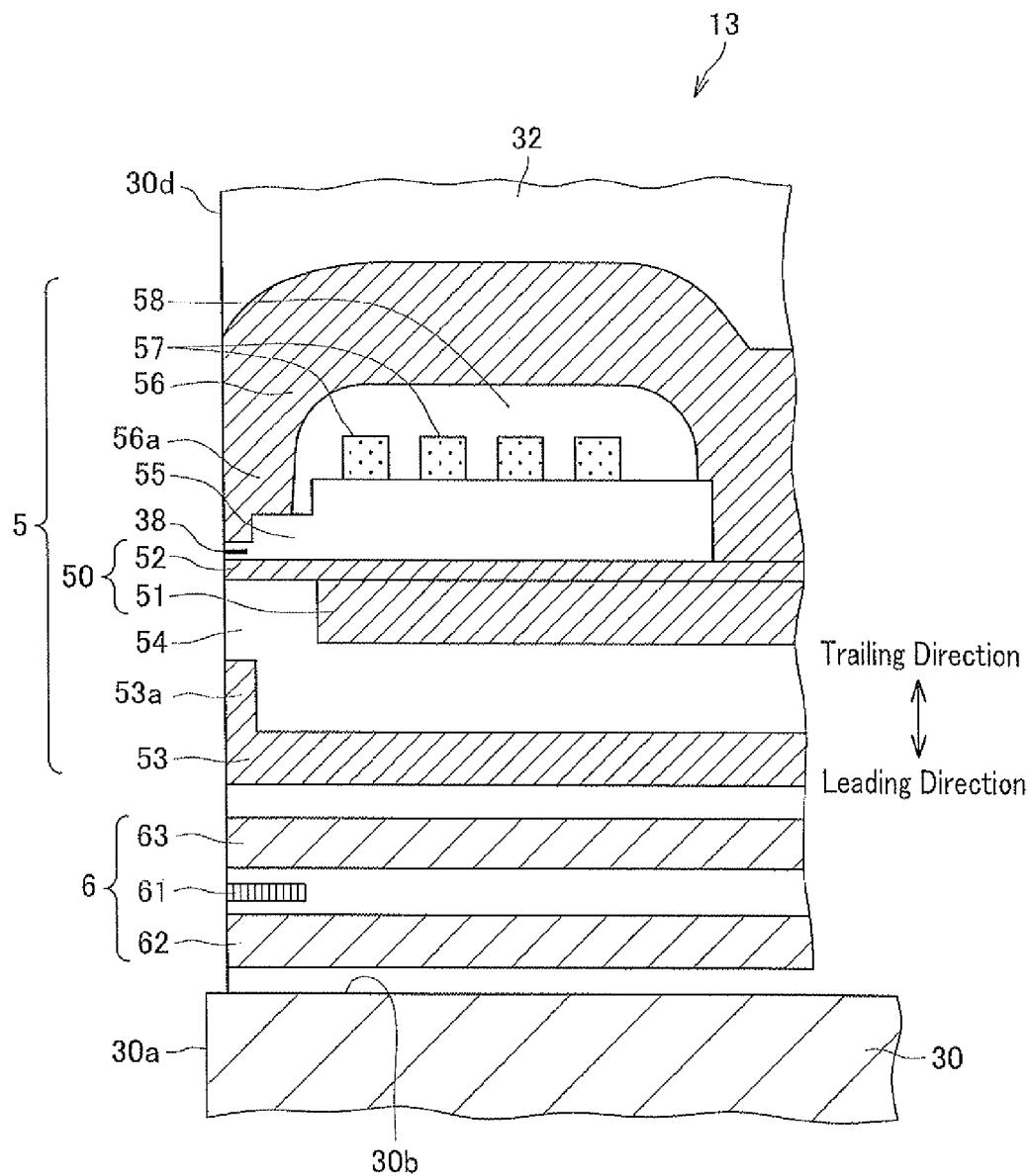
FIG. 4 is a cross-sectional view at line A-A in FIG. 3 schematically showing the entire thin film magnetic head 13 in this embodiment.
Figure 5:
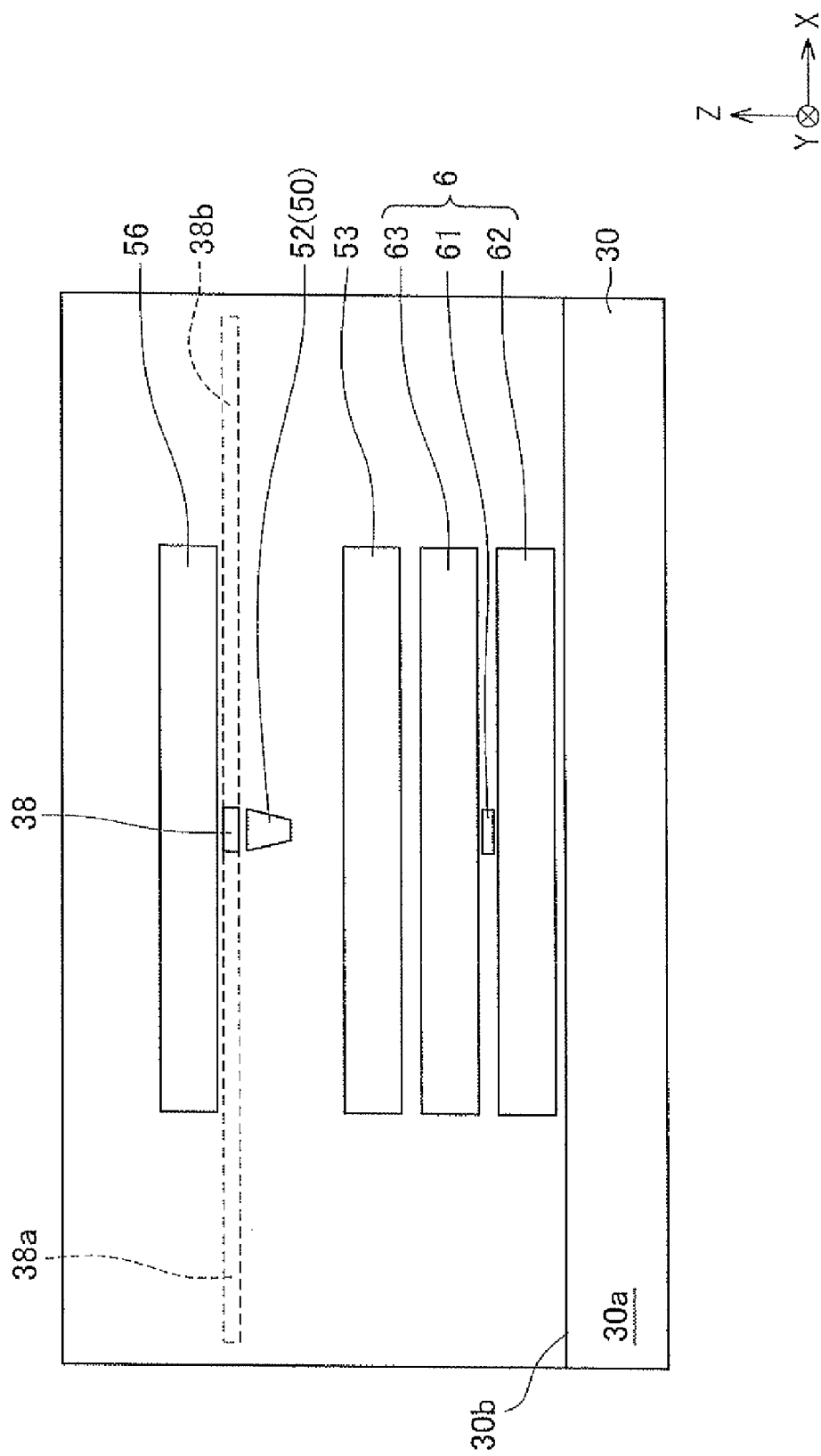
FIG. 5 is a cross-sectional view schematically showing the structure of the thin film magnetic head 13 in this embodiment when seen from an ABS side.
Figure 6:
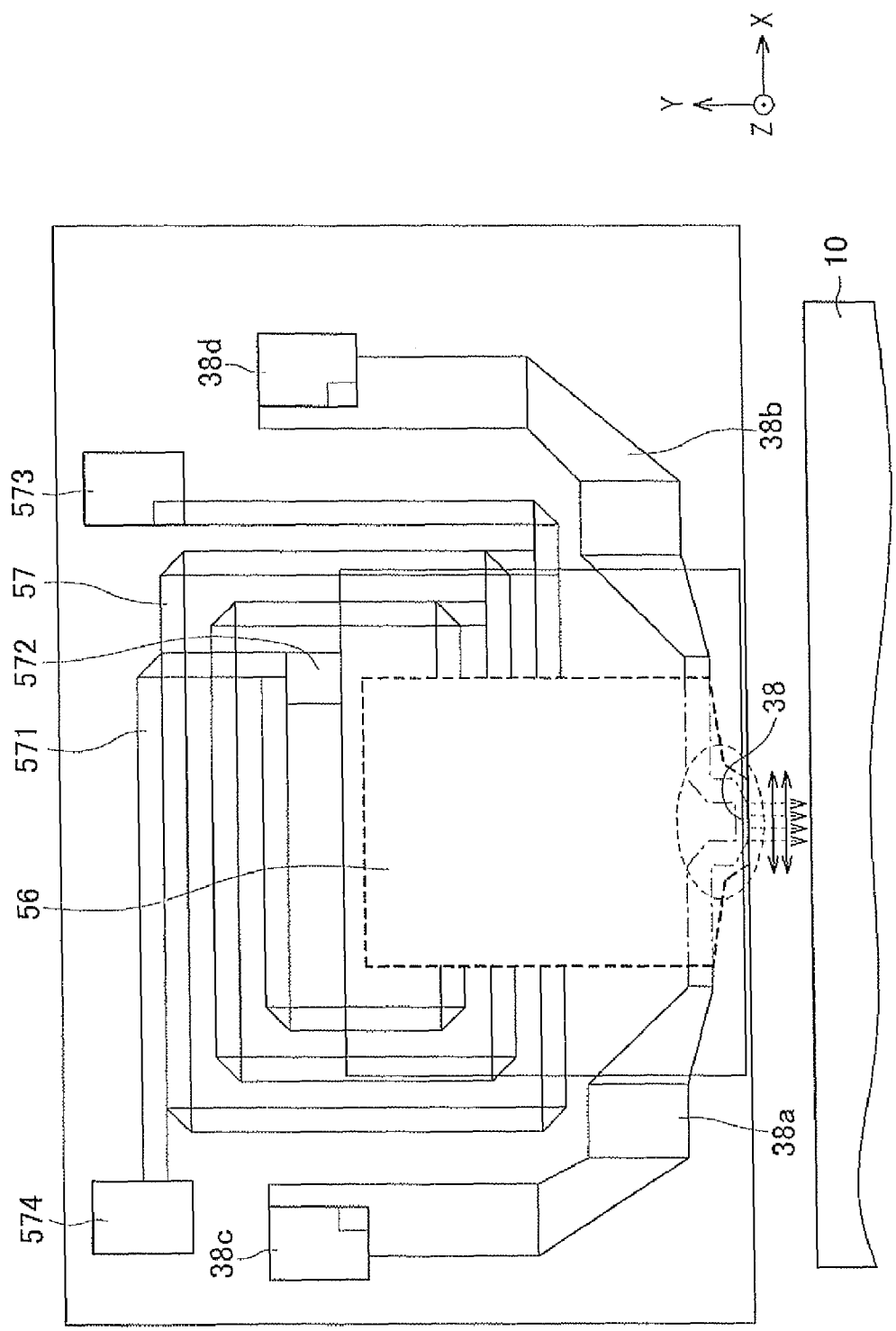
FIG. 6 is a top view showing the structure of a part of the thin film magnetic head 13 in this embodiment when seen from above a substrate.

FIG. 4 is a cross-sectional view at line A-A in FIG. 3 schematically showing the entire thin film magnetic head 13 of this embodiment. FIG. 5 is a cross-sectional view schematically showing the structure of the thin film magnetic head 13 of this embodiment when seen from the ABS side. FIG. 6 is a top view showing the structure of a part of the thin film magnetic head 13 of this embodiment when seen from above the substrate.

In FIGS. 4 and 5, the reference number 30 indicates a slider substrate made of AlTic ($Al_2O_3$—TiC) or the like and having the ABS 30a serving as the opposing surface to a magnetic disk.

The MR reading head element 6, inductive writing head element 5, microwave radiator 38 (see FIG. 5) that is a line conductor of an I-MLIN, described hereafter, and overcoat part 32 protecting these elements are formed as the essential parts on the element formation surface 30b of the slider substrate 30. Particularly, the microwave radiator 38 is a conductor line and the part that actually radiates microwaves onto a magnetic recording medium.

The MR reading head element 6 includes an MR multilayer 61 and a lower shield layer 62 and upper shield layer 63 on either side of the multilayer 61. The MR multilayer 61 is a magnetic reading element composed of a current in plane (CIP) GMR multilayer film, a current perpendicular to plane (CPP) GMR multilayer film, a tunneling magnetoresistive (TMR) multilayer film, or the like, and can sense a signal magnetic field from a magnetic desk with extremely high sensitivity.

The lower shield layer 62 and upper shield layer 63 are magnetic shield layers for preventing the MR multilayer 61 from receiving the influence of external magnetic fields manifest as noise.

When the MR multilayer 61 is composed of a CIP-GMR multilayer film, lower and upper insulating shield gap layers are provided between the lower and upper shield layers 62 and 63 and the MR multilayer 61, respectively. Furthermore, an MR lead conductor layer is formed for supplying a sense current to the MR multilayer 61 and retrieving reproduction output.

On the other hand, when the MR multilayer 61 is composed of a CPP-GMR multilayer film or a TMR multilayer film, the lower and upper shield layers 62 and 63 also function as the upper and lower electrode layers, respectively. In such a case, the lower and upper shield gap layers and MR lead conductor layer are unnecessary.

Furthermore, not-shown bias layers for applying a longitudinal bias magnetic field to stabilize the magnetic domain structure in the free layer that is a sensor layer are formed on either side of the MR multilayer 61 in the track width direction via an insulating layer.

The inductive writing head element 5 is used for perpendicular magnetic recording and includes a main pole layer 50 (simply termed "the main pole 50" hereafter) as a magnetic pole generating a writing magnetic field from the end part on the ABS 30a (slider end surface 30d) side at the time of writing data signals, a writing coil 57, a writing coil insulating layer 58, an auxiliary pole layer 56 (simply termed "the auxiliary pole 56" hereafter) as an auxiliary pole, an auxiliary shield layer 53 as an auxiliary shield, a leading gap layer 54, and a trailing gap layer 55 (simply termed "the nonmagnetic dialectic layer 55" hereafter). The writing coil 57 has a helical shape and is so formed as to pass between the main pole layer 50 and auxiliary pole layer 56 at least at each turn. The auxiliary pole layer 56 is magnetically connected to the main pole layer 50 at the rear portion that is spaced from the end part on the ABS 30a (slider end surface 30d) side.

The main pole 50 is a magnetic path guide for leading the magnetic flux generated upon application of a writing current to the writing coil 57 to the magnetic recording layer of a magnetic disk on which writing is made while making it converge. The main pole 50 is composed of a main pole yoke layer 51 and a main pole core layer 52.

Here, the thickness of the main pole 50 at the end on the ABS 30a side is reduced and is equal to the thickness of the main pole core layer 52 alone.

Consequently, a fine, converged intense writing magnetic field corresponding to a high recording density can be generated from the ABS end part at the time of writing data signals. The main pole yoke layer 51 and main pole core layer 52 are each formed by sputtering, pattern plating including frame plating, or the like, and composed with layers made of for example, a NiFe, CoFeNi, CoFe, FeN, or FeZrN film or the like having a thickness (of the layer 51) of approximately 0.5 to 3.5 µm and a thickness (of the layer 52) of approximately 0.1 to 1 µm, respectively.

The auxiliary pole 56 and auxiliary shield layer 53 are provided on the trailing side and leading side of the main pole 50, respectively. As described above, the auxiliary pole 56 is magnetically connected to the main pole 50 at the rear portion that is spaced from the end part on the ABS 30a side. However, the auxiliary shield layer 53 is not magnetically connected to the main pole 50 in this embodiment.

The auxiliary pole 56 and auxiliary shield layer 53 have a trailing shield part 56a and a leading shield part 53a at the end on the ABS side, respectively, where they have an increased thickness in layer cross section compared with the other part as shown in FIG. 4.

The trailing shield part 56a faces the vicinity of the end of the main pole 50 on the ABS side via a nonmagnetic dielectric layer 55 that is the trailing gap layer 55. The leading shield part 53a faces the vicinity of the end of the main pole 50 on the ABS side via the leading gap layer 54.

With the above trailing shield part 56a and leading shield part 53a being provided, the wiring magnetic field between the trailing shield part 56a and the end part of the main pole 50 and between the end part of the leading shield part 53a and the end part of main pole 50 can have a steep magnetic field gradient due to magnetic flux shunt effect. Consequently, signal output jitter can be reduced and reading error rates can be diminished.

Here, it is possible to properly tailor the auxiliary pole 56 or auxiliary shield layer 53 to place a part of the auxiliary pole 56 or auxiliary shield layer 53 near either side of the main pole 50 in the track width direction so as to provide a so-called side shield. In such a case, the magnetic flux shunt effect is enhanced.

The lengths in the layer thickness direction (thicknesses) of the trailing shield part 56a and leading shield part 53a are preferably several tens to several hundred times larger than the thickness of the main pole 50 in the same direction.

The gap length of the nonmagnetic dielectric layer 55 that is the trailing gap layer 55 is preferably approximately 10 to 100 nm and more preferably approximately 20 to 50 nm. The gap length of the leading gap layer 54 is preferably 0.1 µm or larger.

The auxiliary pole 56 and auxiliary shield layer 53 are composed of, for example, a NiFe, CoFeNi, CoFe, FeN, or FeZrN film or the like formed by pattern plating including frame plating or the like and having a thickness of approximately 0.5 to 4 µm.

The nonmagnetic dielectric layer 55 that is the trailing gap layer 55 and the leading gap layer 54 can be composed of for example, an alumina ($Al_2O_3$), silicon oxide ($SiO_2$), aluminum nitride (AlN), or DLC film or the like formed by sputtering, chemical vapor deposition (CVD), or the like and having a thickness of approximately 0.1 to 3 µm.

As shown in FIG. 6, writing signals are applied to the writing coil 57 via a lead conductor 571 and via hole conductors 572, 573, and 574. As shown in FIG. 4, a writing coil insulating layer 58 surrounds the writing coil 57 for electrically insulating the writing coil 57 from the surrounding magnetic layers and the like. The writing coil 57 is composed of, for example, a Cu film or the like formed by frame plating, sputtering, or the like and having a thickness of approximately 0.1 to 5 µm.

The lead conductor 571 and via hole conductors 572, 573, and 574 shown in FIG. 6 are also composed of, for example, a Cu film or the like formed by frame plating, sputtering, or the like.

The wiring coil insulating layer 58 (FIG. 4) is composed of, for example, thermally cured photoresist or the like formed by photolithography or the like and having a thickness of approximately 0.5 to 7 µm.

As shown in FIGS. 5 and 6, in this embodiment, the microwave radiator 38 that is an I-MLIN line conductor is formed between the main pole core layer 52 of the main pole 50 and the trailing shield part 56a of the auxiliary pole 56. The microwave radiator 38 radiates a microwave electric field from the bottom end part toward the magnetic recording medium. A high frequency magnetic field is generated in the in-plane direction perpendicular to this electric field, described in detail hereafter. In FIG. 4, the microwave radiator 38 is omitted because of insufficient space for clear illustration.

In this embodiment, as shown in FIG. 5, the microwave radiator 38 that is a line conductor has a length in the track width direction that is equal to the length in the track width direction of the main pole core layer 52 of the main pole layer 50. A microwave excitation current and a direct-current excitation current is applied to the microwave radiator 38 via lead conductors 38a and 38b and via hole conductors 38c and 38d.

The microwave radiator 38, lead conductors 38a and 38b, and via hole conductors 38c and 38d are composed of, for example, a Cu film or the like formed by sputtering or the like.

The microwave radiator 38 has one end grounded via a lead conductor or via hole conductor or terminated with a resistance element (not-shown) equivalent to the value of the characteristic impedance of the I-MLIN and the other end connected to an excitation current supply circuit via a lead conductor or via hole conductor.

More specifically, the microwave radiator 38 that is a line conductor is, for example, rectangular in a cross-section perpendicular to the track width direction (the X-direction) and has a length of approximately 10 to 30 nm in the Y-direction and a length of 10 to 100 nm in the Z-direction.

(Description of the Essential Parts of the Invention)

The essential parts of the present invention are described hereafter. The essential parts of the present invention reside in that the microwave radiator 38 is provided between the main pole 50 and auxiliary pole 56, the gap between the main pole 50 and auxiliary pole 56 is filled with the nonmagnetic dielectric layer 55, the nonmagnetic dielectric layer 55 has an inclined surface at the end on the opposing medium surface side by which the microwaves radiated from the microwave radiator 38 is bent toward the main pole.

A more specific explanation will be made hereafter.

First Embodiment

Figure 7:
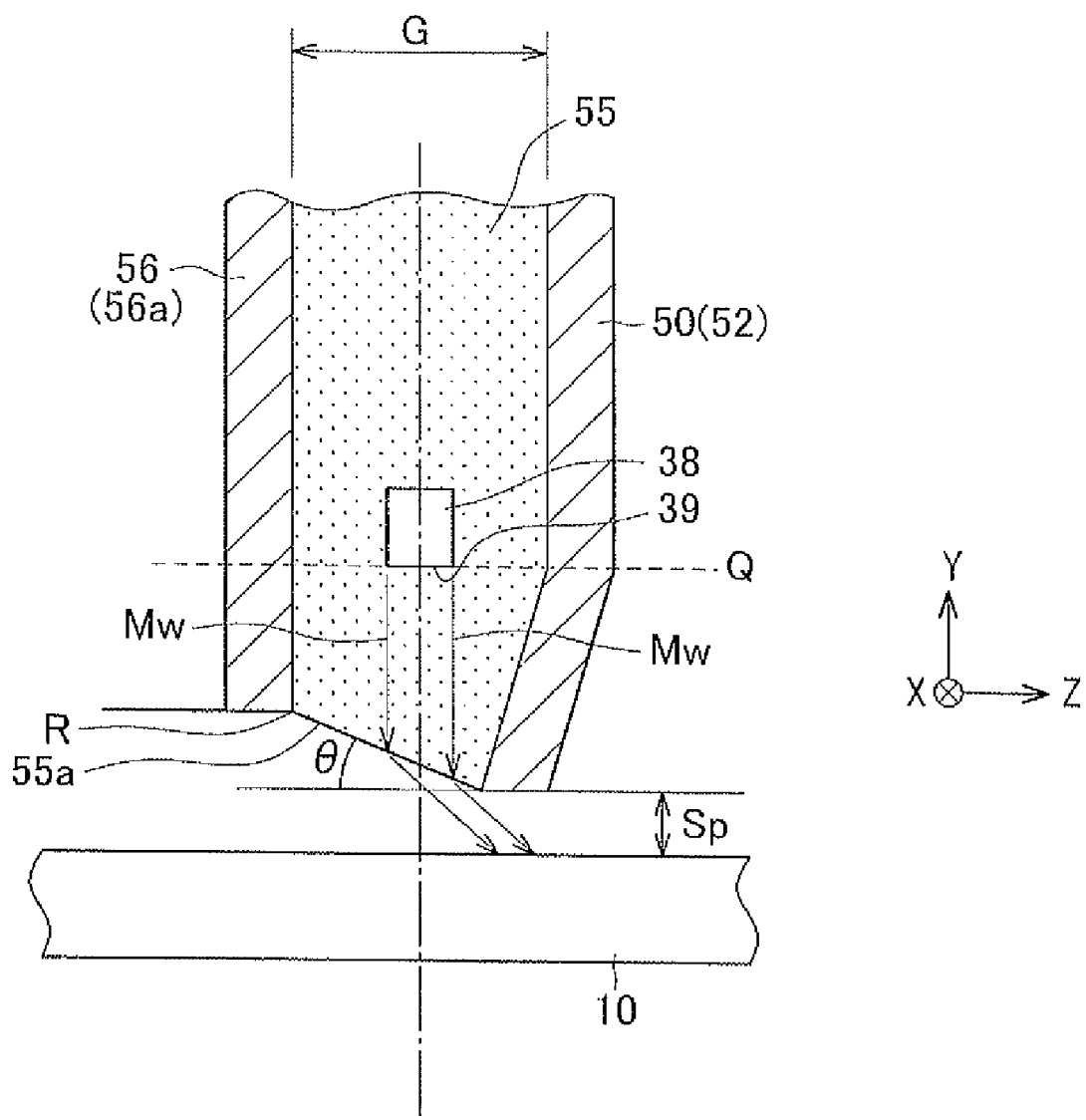
FIG. 7 is a cross-sectional view of a first embodiment of the essential parts of the present invention, showing the relationships among the main pole, an auxiliary pole side and a microwave radiator interposed between them when seen from a cross-section cut in a perpendicular direction with respect to the track width direction.

FIG. 7 is a cross-sectional view showing the first embodiment of the essential parts of the present invention.

More specifically, FIG. 1 is a cross-sectional view showing the relationships among the main pole 50 (52), auxiliary pole 56 (56a) and the microwave radiator 38 provided between the magnetic poles in a cross-section perpendicular to the track width direction.

An I-MLIN is composed of the microwave radiator 38 and a ground conductor by means of a magnetic recording medium (a magnetic disk 10) that the thin magnetic head 13 faces.

An "I-MLIN (inverted microstrip waveguide)" is a modified version of an MLIN (microstrip waveguide). More specifically, in an MLIN, the microwave radiator 38 that is a line conductor is provided on one side of a dielectric substrate and a ground conductor is provided on the other side of the dielectric substrate. On the other hand, in an I-MLIN, the microwave radiator 38 that is a line conductor is provided on one side of a dielectric substrate and nothing is provided on the other side; a ground conductor is so provided as to face one surface of the microwave radiator 38 and dielectric substrate via a space.

As shown in FIG. 1, the magnetic disk 10 is a conductor as a whole and grounded via the spindle motor 11 and its rotation shaft 11a. Therefore, the magnetic disk 10 serves as a ground conductor. In such a case, the nonmagnetic dielectric layer 55 made of a nonmagnetic layer such as alumina corresponds to the dielectric substrate.

It is noted that the main pole 50 and auxiliary pole 56 are sufficiently illustrated to the extent that the essential parts of the invention are explained. For this reason, these members are simplified in FIG. 7.

As shown in FIG. 7, the microwave radiator 38 is interposed between the main pole 50 (52) and auxiliary pole 56 (56a) in the vicinity of the opposing surface facing the magnetic recording medium 10 that is a recording target. As described above, the microwave radiator 38 is omitted in FIG. 4 because of insufficient space for clear illustration.

The microwave radiator 38 is provided separately from the writing magnetic field generation means having the coil 57. Receiving a microwave excitation current, the microwave radiator 38 can radiate a microwave band resonant magnetic field having a frequency equal to or close to the ferromagnetic resonant frequency $F_R$ of the magnetic recording medium that is a recording target.

As shown in FIG. 7, the gap between the main pole 50 and auxiliary pole 46 is filled with the nonmagnetic dielectric layer 55 to embed the microwave radiator 38 and fill the gap.

In the mode shown in FIG. 7, the nonmagnetic dielectric layer 55 characteristically has an inclined surface 55a at the end on the opposing medium surface side, by which the microwaves (electric force lines) Mw radiated from the microwave radiator 38 is bent toward the main pole 50. A magnetic field perpendicular to the microwaves (electric force lines) Mw is generated.

In order to turn the radiation direction of the microwave radiator 38 toward the main pole 50 by means of the inclined surface 55a of the nonmagnetic dielectric layer 55 at the end on the opposing medium surface side as shown in FIG. 7, the dielectric constant of the material composing the nonmagnetic dielectric layer 55 and the difference in electric waves propagation speed due to the difference in dielectric constant between the medium and recording head can be utilized. Considering the rules of light refraction, a similar phenomenon can be understood.

As shown in FIG. 7, the inclined surface 55a of the nonmagnetic dielectric layer 55 at the end on the opposing medium surface side is formed in a manner of tilting and descending toward the main pole 50 in the Z-direction by an angle θ when viewed from a cross-section (a Y-Z plane) cut in a perpendicular direction with respect to the track width direction (the X-direction), and the opposing medium surface is disposed to face downwardly (the −Y-direction).

The angle θ is determined so that the position on the magnetic recording medium that is a recording target at which the writing magnetic flux radiated from the tip of the main pole 50 by the wiring magnetic field generation means having the coil 57 falls is substantially the same as the position on the magnetic recording medium that is a recording target at which the microwaves radiated from the microwave radiator 38 fall after being bent toward the main pole 50 by the inclined surface 55a. The "substantially the same position" means that the positions are within an error range of ±5 nm from completely the same position, including completely the same position.

Major parameters for determining the angle θ include the specific dielectric constant of the nonmagnetic dielectric layer 55, spacing Sp between the thin film magnetic head and magnetic recording medium (FIG. 7), gap length G between the main pole 50 and auxiliary pole 56, and the like. The angle θ can properly be designed in consideration of these parameters. The microwave radiator 38 is placed nearly at the center of the gap length G.

The nonmagnetic dielectric layer 55 is composed of, for example, at least one substance selected from the group including alumina, beryllia, mullite, glass, silicon nitride, epoxy, and $SiO_2$. These materials have a specific dielectric constant of approximately 6 to 9. The spacing Sp can be approximately 10 nm. The gap length G can be approximately 30 nm.

From the above viewpoints, the specific angle θ can be set to 10 to 20° and preferably to 12 to 18°.

In the first embodiment shown in FIG. 7, the main pole 50 is slightly bent toward the auxiliary pole at the tip part. The bending start point (the line Q) and the underside 39 of the microwave radiator 38 are substantially at the same horizontal level. The bending start point (the line Q) is 10 to 20 nm set back from the tip of the main pole.

With the above geometry, a sufficient propagation distance is obtained and stable radiation from the microwave radiator 38 is assured. Furthermore, in the first embodiment shown in FIG. 7, the auxiliary pole 56 is set back in the Y-direction compared with the main pole 50 so that the underside of the auxiliary pole 56 is flush with the point R where it makes contact with the nonmagnetic dielectric layer 55; there is no extra protruding portion. In this way, there is no influence of direction of microwaves toward the auxiliary pole 56.

In other words, the first embodiment shown in FIG. 7 is the best mode.

Second Embodiment

Figure 8:
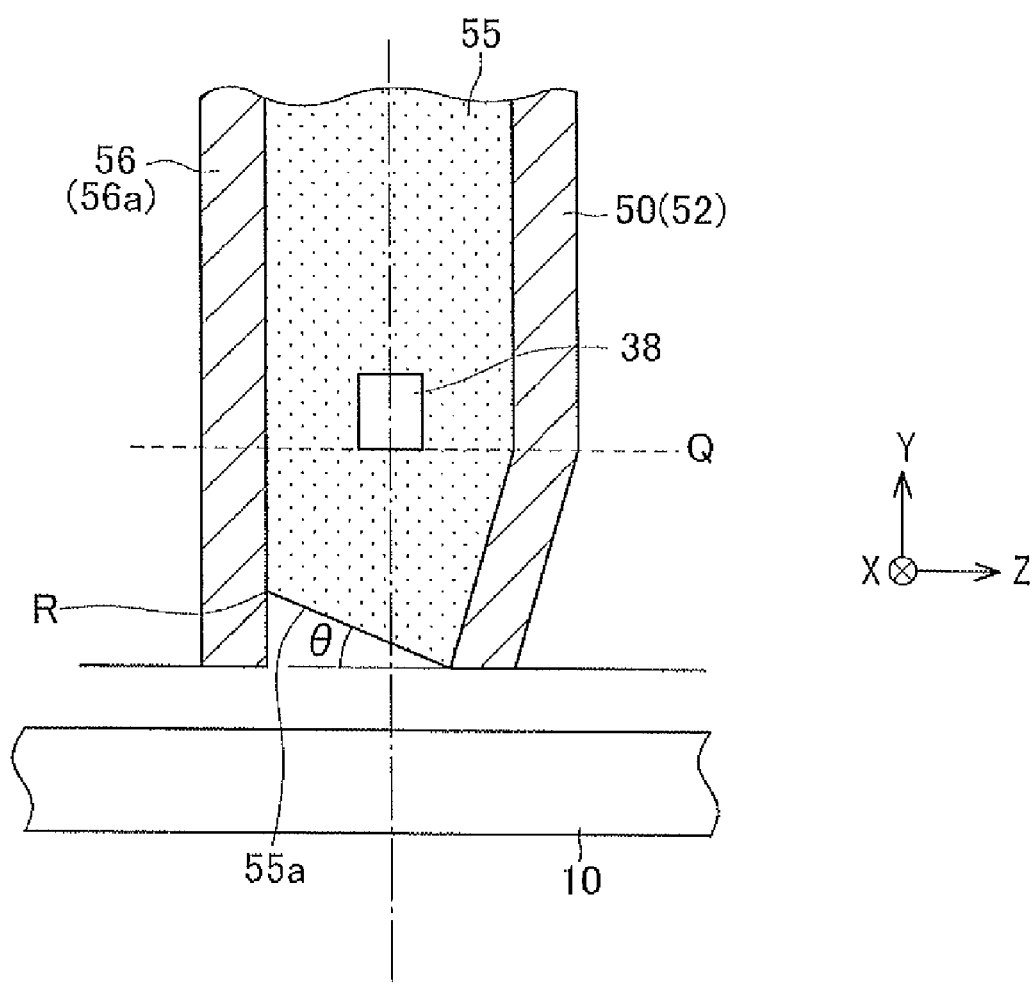
FIG. 8 is a cross-sectional view of a second embodiment of essential parts of the present invention, showing the relationships among the main pole, the auxiliary pole side and the microwave radiator interposed between them when viewed from a cross-section cut in a perpendicular direction with respect to the track width direction.

FIG. 8 is a cross-sectional view showing the second embodiment of the essential parts of the present invention.

The second embodiment is different from the first embodiment shown in FIG. 7 in that the auxiliary pole 56 and main pole 50 are equal in length in the Y-direction and, therefore, the auxiliary pole 56 has an extra protruding portion. In other words, the underside of the auxiliary pole 56 is not flush with the point R where it makes contact with the nonmagnetic dielectric layer 55.

Also in the second embodiment, the microwaves from the microwave radiator 38 can be bent toward the main pole 50 by the inclined surface 55a of the nonmagnetic dielectric layer 55 at the end on the opposing medium surface side. However, compared with the first embodiment, there will be a slight influence of direction of microwaves toward the auxiliary pole 56.

Third Embodiment

Figure 9:
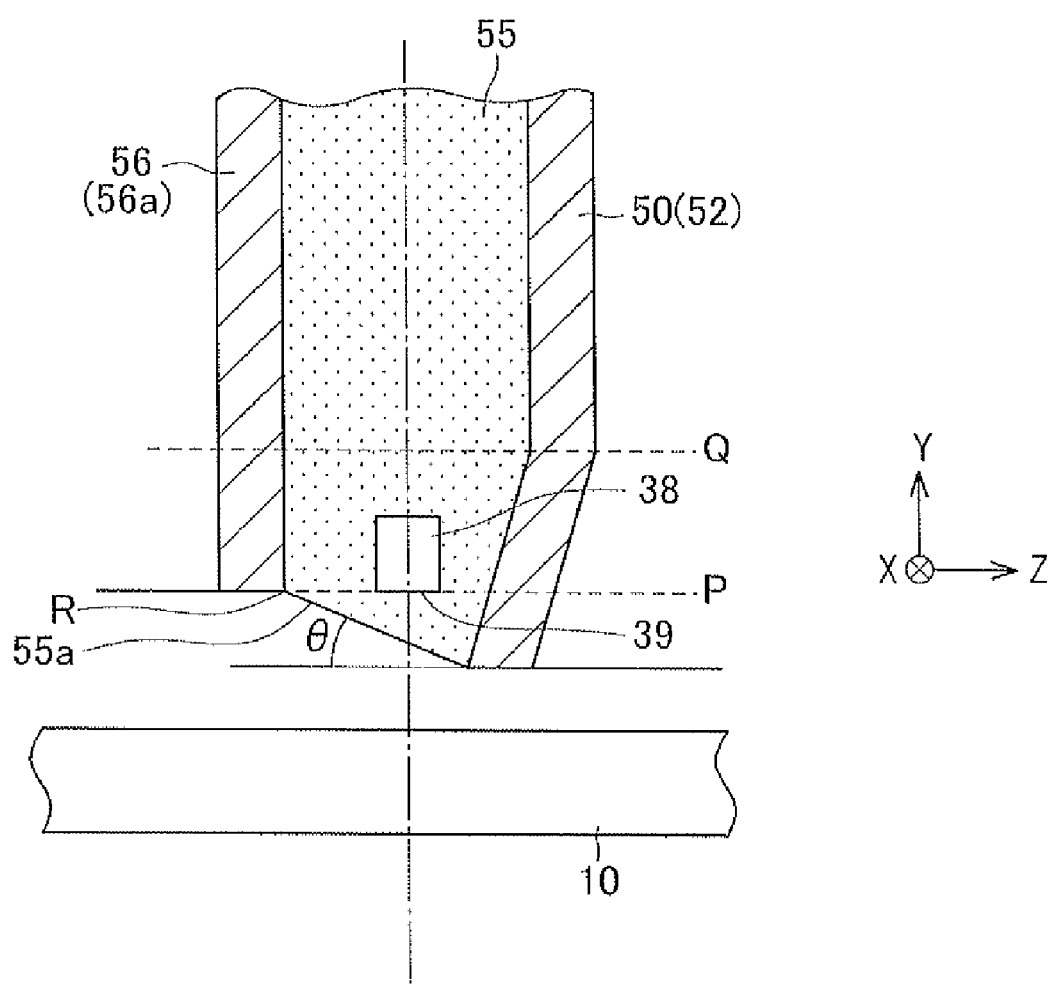
FIG. 9 is a cross-sectional view of third embodiment of essential parts of the present invention, showing the relationships among the main pole, the auxiliary pole side and the microwave radiator interposed between them when viewed from a cross-section cut in a perpendicular direction with respect to the track width direction.

FIG. 9 is a cross-sectional view showing the third embodiment of the essential parts of the present invention. The third embodiment is different from the first embodiment shown in FIG. 7 in which the underside 39 of the microwave radiator 38 (the line P) is lower than the bending start point of the main pole 50 (the line Q).

Also in the third embodiment, the microwaves from the microwave radiator 38 can be inclined toward the main pole 50 at the inclined surface 55a of the nonmagnetic dielectric layer 55 at the end on the opposing medium surface side. However, compared with the first embodiment, a propagation distance (radiation distance) from the underside 39 of the microwave radiator 38 (the line P) is shorter; therefore, the radiation stability may be insufficient in some cases.

Fourth Embodiment

Figure 10:
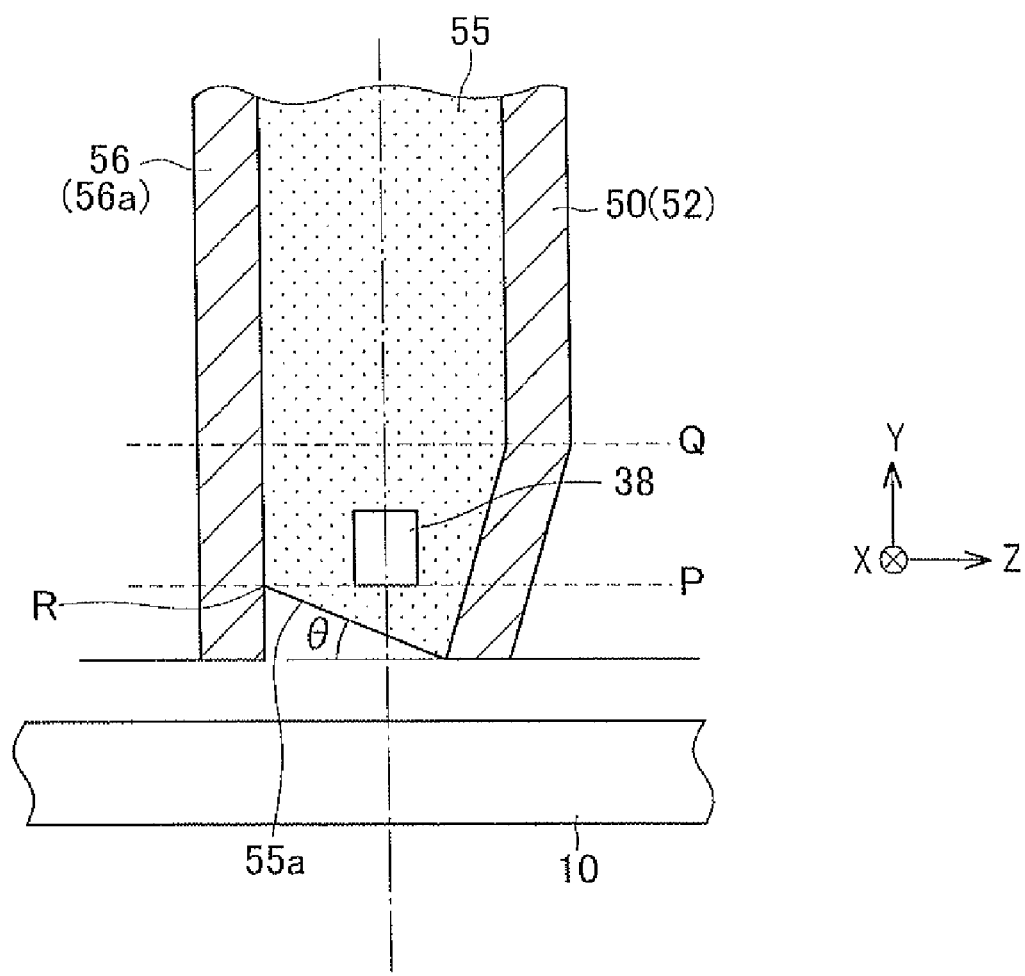
FIG. 10 is a cross-sectional view of fourth embodiment of essential parts of the present invention, showing the relationships among the main pole, the auxiliary pole side and the microwave radiator interposed between them viewed from a cross-section cut in a perpendicular direction with respect to the track width direction.

FIG. 10 is a cross-sectional view showing the fourth embodiment of the essential parts of the present invention. The fourth embodiment is different from the first embodiment shown in FIG. 7 in that the underside 39 of the microwave radiator 38 (the line P) is lower than the bending start point of the main pole 50 (the line Q) and the auxiliary pole 56 and main pole 50 are equal in length in the Y-direction; therefore the auxiliary pole 56 has an extra protruding portion.

Also in the fourth embodiment, the microwaves from the microwave radiator 38 can be bent toward the main pole 50 by the inclined surface 55a of the nonmagnetic dielectric layer 55 at the end on the opposing medium surface side.

However, compared with the first embodiment, unstable radiation and influence of suction of microwaves towards the auxiliary pole 56 may occur.

Fifth Embodiment

Figure 11:
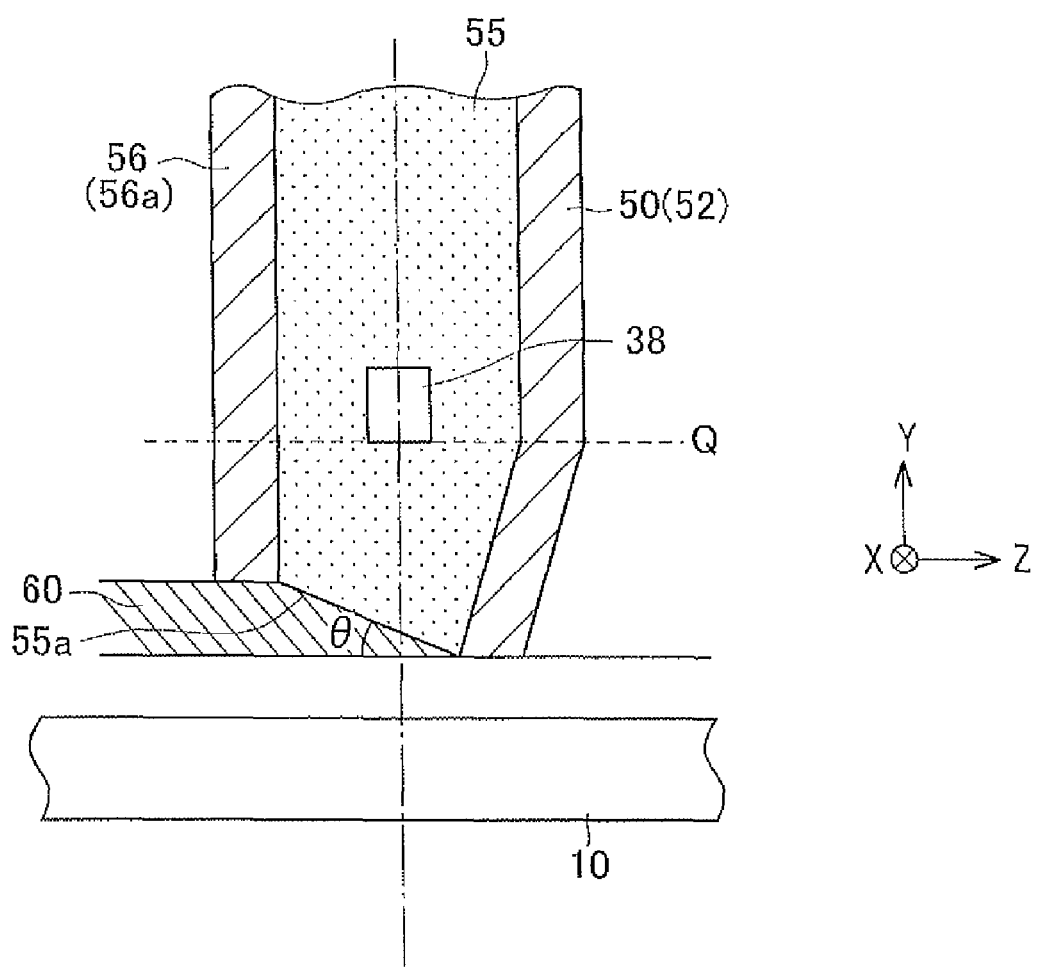
FIG. 11 is a cross-sectional view of fifth embodiment of essential parts of the present invention, showing the relationships among the main pole, the auxiliary pole side and the microwave radiator interposed between them viewed from a cross-section cut in a perpendicular direction with respect to the track width direction.

FIG. 11 is a cross-sectional view showing the fifth embodiment of the essential parts of the present invention. The fifth embodiment is different from the first embodiment shown in FIG. 7 in that the recess part created by forming the inclined surface 55a of the nonmagnetic dielectric layer 55 at the end on the opposing medium surface side is filled with a nonmagnetic filler layer 60 and the opposing medium surface is flat.

It is preferred that the specific dielectric constant of the nonmagnetic filler layer 60 is smaller than the specific dielectric constant of the nonmagnetic dielectric layer 55. This is because in this way, the microwaves can easily be bent toward the main pole 50 by the inclined surface 55a at the end on the opposing medium surface side. The nonmagnetic filler layer 60 can be made of, for example, inorganic materials such as silicon oxide and quartz glass and organic materials such as Teflon resin and epoxy resin.

Embodiments of First and Second Comparative Examples

Figure 12:
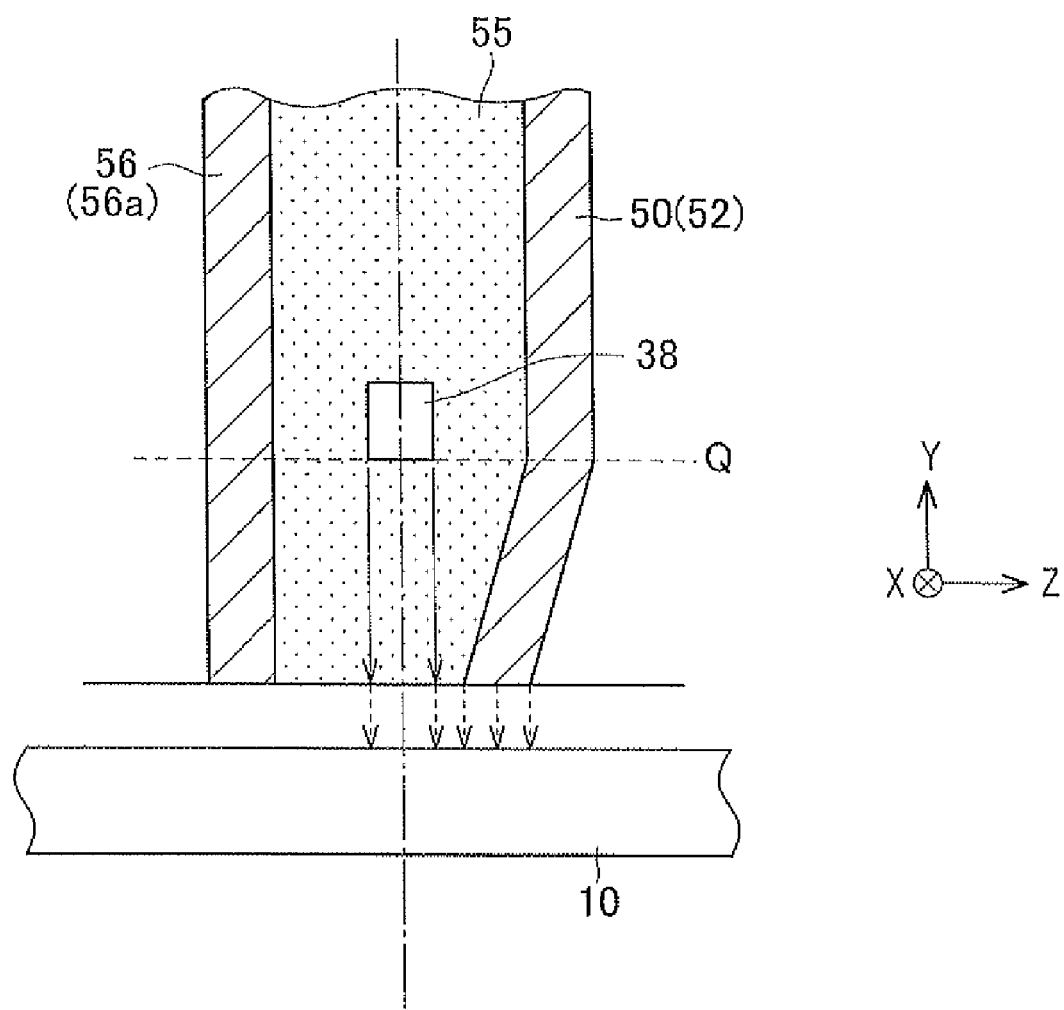
FIG. 12 is a cross-sectional view of first comparative example, showing the relationships among the main pole, the auxiliary pole side and the microwave radiator interposed between them when viewed from a cross-section cut in a perpendicular direction to the track width direction.
Figure 13:
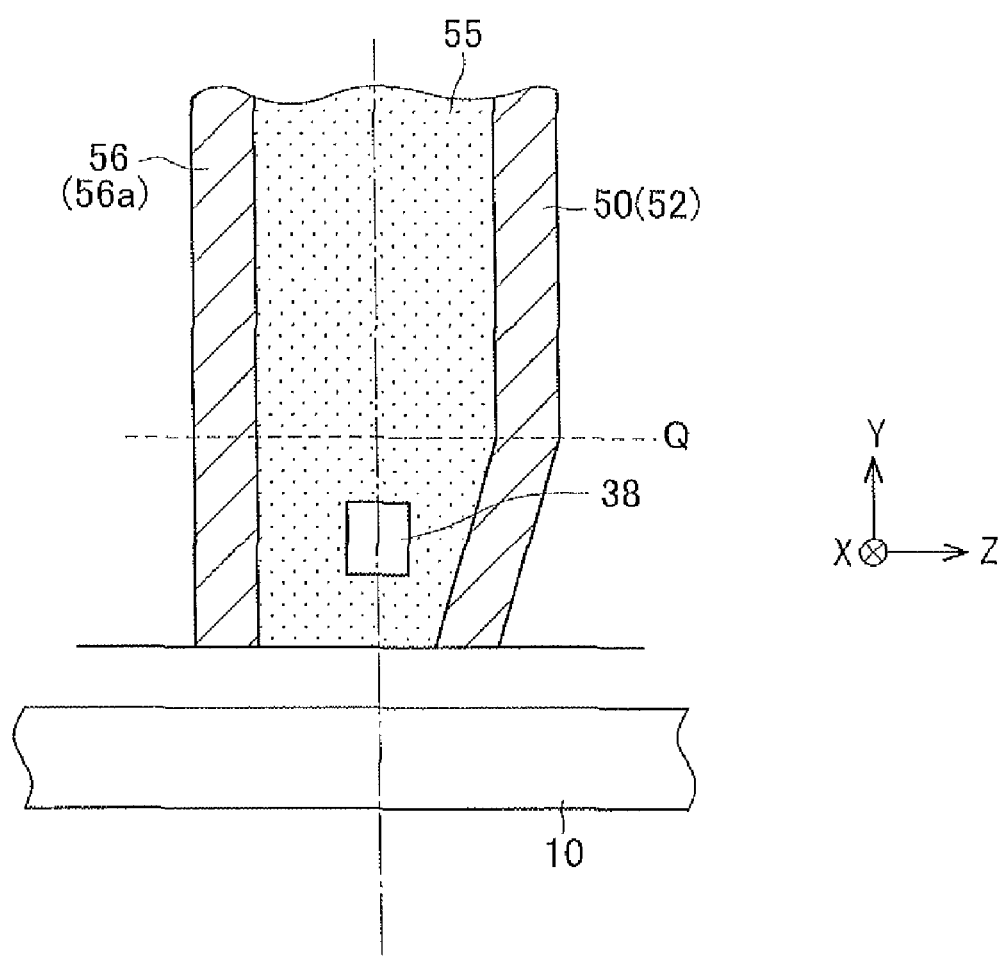
FIG. 13 is a cross-sectional view of second comparative example, showing the relationships among the main pole, the auxiliary pole side and the microwave radiator interposed between them when viewed from a cross-section cut in a perpendicular direction to the track width direction.

FIGS. 12 and 13 show first and second comparative examples, respectively. In these figures, there is no formation of the inclined surface 55a of the nonmagnetic dielectric layer 55 at the end on the opposing medium surface side by which the microwaves (electric force lines) radiated from the microwave radiator 38 are bent toward the main pole 50. Therefore, as shown in FIG. 12, the position on the magnetic disk 10 at which the microwaves (electric force lines) radiated from the microwave radiator 38 fall is shifted from the position on the magnetic disk 10 at which the recording magnetic field generated from the main pole falls. The same shift occurs in the second comparative example shown in FIG. 13.

(Description of Effects of the Essential Parts of the Present Invention)

A writing magnetic field for recording is applied to a magnetic recording medium that is a recording target placed directly below the tip of the main pole by means of the writing magnetic field generation means having the coil 57.

On the other hand, a microwave excitation current is applied to the microwave radiator 38 so that first, the microwave radiator 38 radiates microwaves (electric force lines) toward the magnetic disk 10. The radiated microwaves are bent toward the main pole 50 by the inclined surface 55a and propagated to the same position as the writing magnetic flux. A resonant magnetic field is radiated in the longitudinal direction (in the in-plane direction of the magnetic disk surface or nearly in the in-plane direction and also in the track direction) perpendicular to the electric force lines.

The radiated resonant magnetic field is a microwave band high frequency magnetic field having a frequency equal to or close to the ferromagnetic resonant frequency $F_R$ of the magnetic recording layer of the magnetic disk 10. With such a longitudinal resonant magnetic field being applied to the magnetic recording layer at the time of writing, the intensity of the perpendicular (the direction perpendicular or nearly perpendicular to the surface of the magnetic recording layer) writing magnetic field that is necessary for writing can significantly be reduced.

As described above, a large high frequency current is required to radiate a resonant magnetic field using only microwaves. A direct-current excitation current radiating a static magnetic field of approximately 80% of the magnetic coercive force of the magnetic disk 10 is applied to the line conductor 38 in a superimposed manner so that the microwave electric power to be applied can be reduced.

The ratio of the intensity Hp and the intensity Hh is preferably Hh/Hp=approximately 0.1 to 0.4. Wherein, the intensity Hp is a value of the perpendicular magnetic field applied to the recording target directly below the tip of the main pole by means of the writing magnetic field generation means having the coil 57, the intensity Hh is a value of the in-plane magnetic field applied to the recording target from the microwave radiator 38.

(Description of Electrical Configuration of Magnetic Disk Device)

Figure 14:
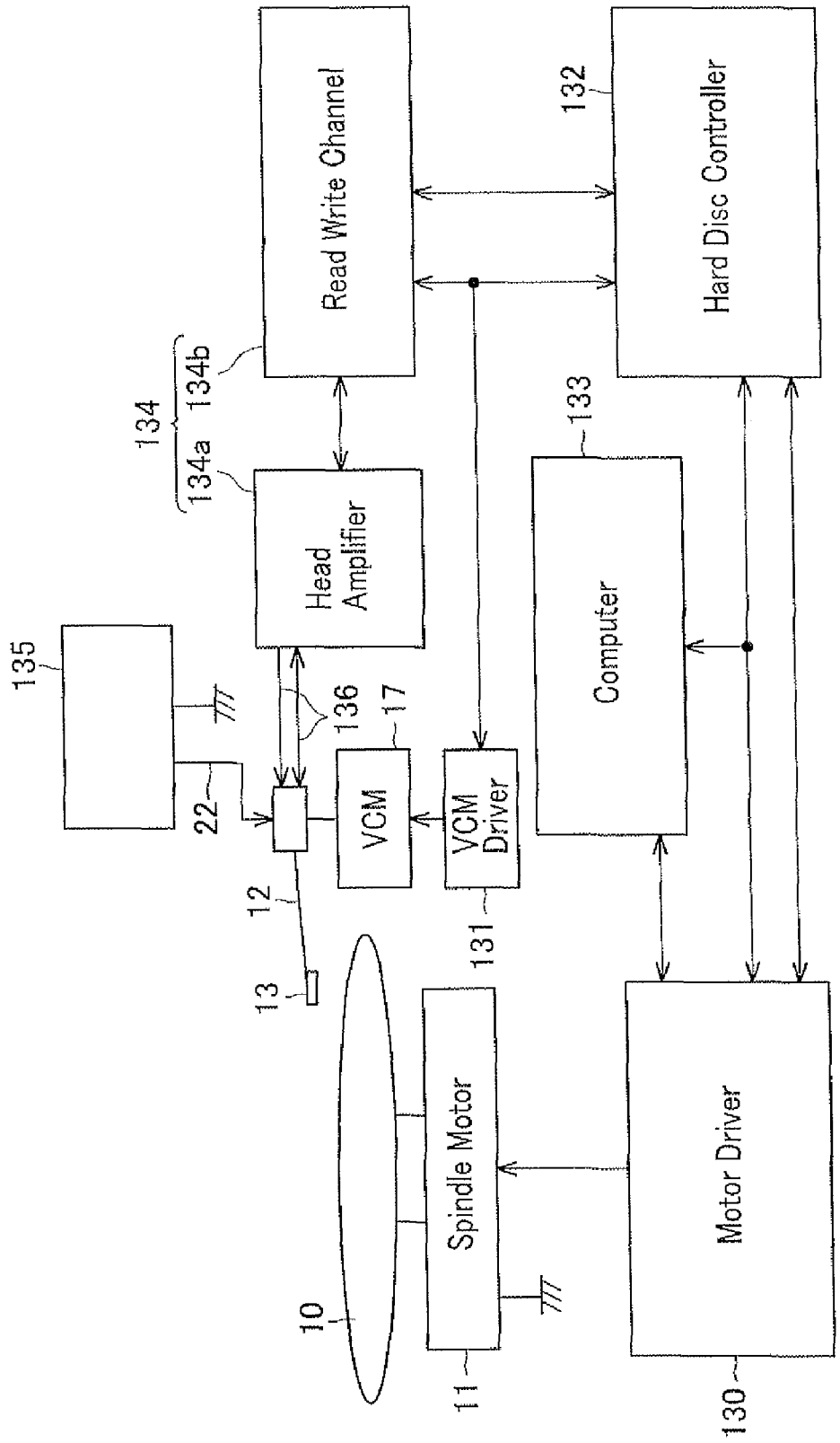
FIG. 14 is a block diagram schematically showing the electrical configuration of a magnetic disk device.

FIG. 14 is a block diagram schematically showing the electrical configuration of a magnetic disk device.

In FIG. 14, the reference number 11 indicates a spindle motor rotating the magnetic disk 10, the reference number 130 indicates a motor driver that is a driver for the spindle motor 11, and the reference number 131 indicates a VCM driver that is a driver for a VCM 17.

The reference number 132 indicates a hard disk controller (HDC) controlling the motor driver 130 and VCM driver according to control of a computer 133. The reference number 134 indicates a read/write IC circuit including a head amplifier 134a and a read/write channel 134b for the thin film magnetic head 13. The reference number 135 indicates an excitation current supply circuit supplying a microwave excitation current and a direct-current excitation current. The reference number 136 indicates head element wiring members for applying a writing current to the writing head element and for applying a constant current to the reading head element and retrieving a reading output voltage.

One output terminal of the excitation current supply circuit 135 is connected to the microwave radiator 38 of the thin film magnetic head 13 via an excitation current wiring member 22 and the other is grounded. The magnetic disk 10 is grounded via the spindle motor 11 and the like.

A recording reproduction and resonance control circuit 19 shown in FIG. 1 is composed of the above-described HDC 132, computer 133, read/write IC circuit 134, excitation current supply circuit 135, and the like.

In the present invention, the microwave radiator 38 is composed of an I-MLIN. Therefore, the electric force lines emerging from the microwave radiator 38 directly return to the magnetic disk 10 that is a ground conductor placed at the opposing position. Almost all microwave electric power converted to electric/magnetic fields can be applied to the magnetic disk 10.

The magnetic disk 10 described as a preferred example of the magnetic recording medium is intended for perpendicular magnetic recording and has a known structure having a magnetization orientation layer, soft magnetic lining layer, intermediate layer, magnetic recording layer, and overcoat layer laminated on a disk substrate in sequence.

Description of Specific Experimental Examples

The thin film magnetic head of the present invention having the above-described microwave assisted function will be described in further detail hereafter using the specific experimental examples below.

First Experimental Example

As shown in FIG. 7, the rate at which the electric force lines radiated to the magnetic recording medium from the microwave radiator 38 embedded in the nonmagnetic dielectric layer 55 were bent when they emerged into the air from the inclined surface 55a (slope angle θ) of the nonmagnetic dielectric layer 55 at the end on the opposing medium surface side was calculated as a refraction angle (deg.).

Figure 15:
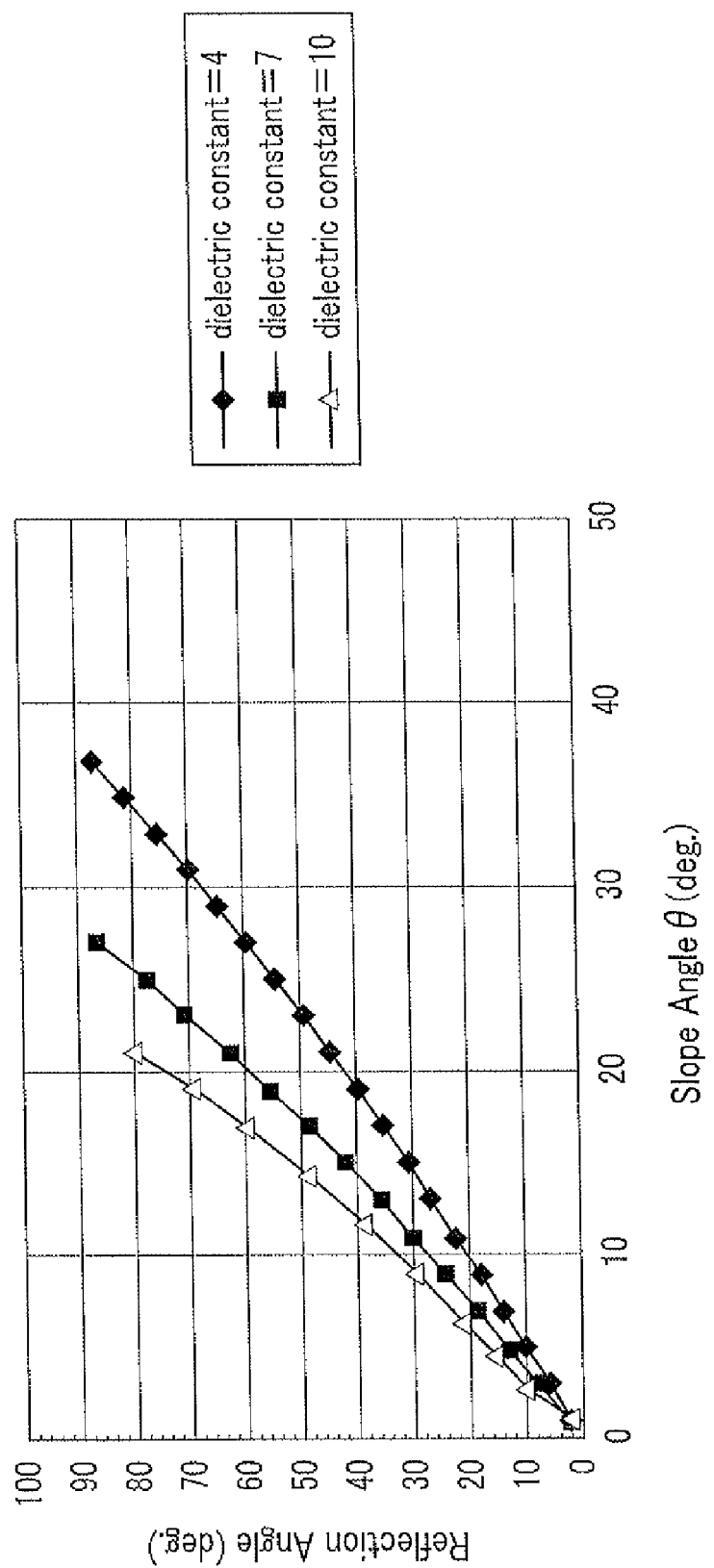
FIG. 15 is a graphical representation showing rates calculated as refraction angles (deg.) at which the electric force lines radiated to the magnetic recording medium from the microwave radiator embedded in the nonmagnetic dielectric layer is bent when it emerges into the air from the inclined surface (slope angle θ) of the nonmagnetic dielectric layer at the end on the ABS side.

FIG. 15 is a graphic representation showing the results. In FIG. 15, parameters are three dielectric constants.

As shown in FIG. 15, the refraction angle (deg.) becomes larger as the dielectric constant of the nonmagnetic dielectric layer 55 is increased because the difference in dielectric constant from the air is increased.

For the same dielectric constant of the nonmagnetic dielectric layer 55, the refraction angle (deg.) becomes larger as the inclined surface 55a (slope angle θ) is more inclined. This is because geometrically, the incident angle is equal to the slope angle θ.

The nonmagnetic dielectric layer 55 is generally made of alumina (the dielectric constant of 7). When the spacing Sp was 10 nm and gap length G was 30 nm, it was confirmed that the slope angle θ of 10 to 20° was sufficient for the electric force lines radiated from the microwave radiator 38 to the magnetic recording medium to reach immediately below the main pole.

Second Experimental Example

In the thin film magnetic heads having the microwave assisted function shown in FIG. 7 (First Embodiment), FIG. 8 (Second Embodiment), FIG. 9 (Third Embodiment), FIG. 10 (Fourth Embodiment), FIG. 11 (Fifth Embodiment), FIG. 12 (First Comparative Example), and FIG. 13 (Second Comparative Example), in which the microwave radiators 38 were provided between the main pole 50 and auxiliary pole 56 and the gap is filled with the nonmagnetic dielectric layer 55, the radiation property of the microwave assisted function was simulated.

The nonmagnetic dielectric layer 55 was made of alumina (the dielectric constant=7), the spacing Sp was 10 nm, and the gap length G was 30 nm. The measurements of the microwave radiator 38, namely the measurements in the Y-direction and Z-direction in a Y-Z plane in FIGS. 7 to 13 were 10 nm and 100 nm, respectively.

In the head structures shown in FIGS. 7 to 13, simulated radiation patterns were measured to determine whether or not microwaves (electric force lines) having a high relative intensity would be radiated directly below the main pole.

FIG. 7 (First Embodiment) and FIG. 11 (Fifth Embodiment) yielded significantly good results showing microwaves (electric force lines) having a high relative intensity being radiated directly below the main pole.

Then, FIG. 8 (Second Embodiment), FIG. 9 (Third Embodiment), and FIG. 10 (Fourth Embodiment) yielded good results in this order.

FIG. 12 (First Comparative Example) and FIG. 13 (Second Comparative Example) were used as reference for comparison and yielded poor results compared with the embodiments.

The effect of the present invention is obvious from the above-described experimental results.

As described above, the gap between the main pole and auxiliary pole composing a thin film magnetic head having the microwave assisted function of the present invention is filled with a nonmagnetic dielectric layer to embed a microwave radiator. The nonmagnetic dielectric layer has an inclined surface at the end on the side of the opposing medium surface by which the microwave radiated from the microwave radiator to be bent toward the main pole, whereby the microwave magnetic field generated from the microwave generator can be gathered immediately below the main pole, further improving the microwave assisted effect.

What is claimed is:

1. A thin film magnetic head provided with a writing magnetic field generation means having a main pole, an auxiliary pole, and a coil wound between the main pole and the auxiliary pole, comprising:

a microwave radiator provided between the main pole and auxiliary pole and in the vicinity of an opposing medium surface facing a magnetic recording medium that is a recording target; and a nonmagnetic dielectric layer filling a gap between the main pole and the auxiliary pole to embed the microwave radiator, wherein the nonmagnetic dielectric layer has an inclined surface at an end on a side of the opposing medium surface by which a microwave radiated from the microwave radiator is bent toward a side of the main pole, wherein the inclined surface of the nonmagnetic dielectric layer formed at the end on the side of the opposing medium surface is downwardly inclined toward the main pole by an angle θ, and the angle θ is set in a range of approximately 10 to 20° when viewed from a cross-section cut in a perpendicular direction with respect to a track width direction and when the opposing medium surface is disposed to face downwardly.

2. The thin film magnetic head of claim 1, wherein a position where a writing magnetic flux for recording that is radiated from a tip of the main pole by the writing magnetic field generation means reaches the magnetic recording medium that is a recording target is substantially the same as a position where a microwave radiated from the microwave radiator reaches the magnetic recording medium that is the recording target after being bent to the main pole side by the inclined surface.

3. The thin film magnetic head according to claim 1, wherein the microwave radiator is provided separately from the writing magnetic field generation means, and is configured to radiate a microwave band resonant magnetic field by applying a microwave excitation current, the microwave band resonant magnetic field having a frequency equal to or close to a ferromagnetic resonant frequency $F_R$ of the magnetic recording medium that is the recording target.

4. The thin film magnetic head according to claim 1, wherein
the nonmagnetic dielectric layer is made of a material having a specific dielectric constant of 6 to 9.

5. The thin film magnetic head according to claim 1, wherein
the nonmagnetic dielectric layer is made of at least one substance selected from the group including alumina, beryllia, mullite, glass, silicon nitride, epoxy, and $SiO_2$.

6. The thin film magnetic head according to claim 1, wherein
the auxiliary pole is positioned rearwardly relative to the main pole on the opposing medium surface,
an underside position of the auxiliary pole is the same as a position where the auxiliary pole and nonmagnetic dielectric layer contact, and
the auxiliary pole has no extra protruding portion.

7. A thin film magnetic head provided with a writing magnetic field generation means having a main pole, an auxiliary pole, and a coil wound between the main pole and the auxiliary pole, comprising:
a microwave radiator provided between the main pole and auxiliary pole and in the vicinity of an opposing medium surface facing a magnetic recording medium that is a recording target; and
a nonmagnetic dielectric layer filling a gap between the main pole and the auxiliary pole to embed the microwave radiator, wherein
the nonmagnetic dielectric layer has an inclined surface at an end on a side of the opposing medium surface by which a microwave radiated from the microwave radiator is bent toward a side of the main pole, wherein
when viewed from a cross-section cut in a perpendicular direction with respect to a track width direction and when the opposing medium surface is disposed to face downwardly,
the tip of the main pole main pole is slightly bent toward the auxiliary pole side, and the bending start point is substantially at the same horizontal level as an underside of the microwave radiator.

8. The thin film magnetic head according to claim 7, wherein
a position where a writing magnetic flux for recording that is radiated from a tip of the main pole by the writing magnetic field generation means reaches the magnetic recording medium that is a recording target is substantially the same as a position where a microwave radiated from the microwave radiator reaches the magnetic recording medium that is the recording target after being bent to the main pole side by the inclined surface.

9. The thin film magnetic head according to claim 7, wherein
the microwave radiator is provided separately from the writing magnetic field generation means, and is configured to radiate a microwave band resonant magnetic field by applying a microwave excitation current, the microwave band resonant magnetic field having a frequency equal to or close to a ferromagnetic resonant frequency $F_R$ of the magnetic recording medium that is the recording target.

10. The thin film magnetic head according to claim 7, wherein
the nonmagnetic dielectric layer is made of a material having a specific dielectric constant of 6 to 9.

11. The thin film magnetic head according to claim 7, wherein
the nonmagnetic dielectric layer is made of at least one substance selected from the group including alumina, beryllia, mullite, glass, silicon nitride, epoxy, and $SiO_2$.

12. The thin film magnetic head according to claim 7, wherein
the auxiliary pole is positioned rearwardly relative to the main pole on the opposing medium surface,
an underside position of the auxiliary pole is the same as a position where the auxiliary pole and nonmagnetic dielectric layer contact, and
the auxiliary pole has no extra protruding portion.

13. A thin film magnetic head provided with a writing magnetic field generation means having a main pole, an auxiliary pole, and a coil wound between the main pole and the auxiliary pole, comprising:
a microwave radiator provided between the main pole and auxiliary pole and in the vicinity of an opposing medium surface facing a magnetic recording medium that is a recording target; and
a nonmagnetic dielectric layer filling a gap between the main pole and the auxiliary pole to embed the microwave radiator, wherein
the nonmagnetic dielectric layer has an inclined surface at an end on a side of the opposing medium surface by which a microwave radiated from the microwave radiator is bent toward a side of the main pole, wherein
a recess part created for forming the inclined surface of the nonmagnetic dielectric layer at the end on the side of the opposing medium surface is filled with a nonmagnetic filler layer, and
the opposing medium surface is flat.

14. The thin film magnetic head according to claim 13, wherein
a specific dielectric constant of the nonmagnetic filler layer is configured to be smaller than a specific dielectric constant of the nonmagnetic dielectric layer.

15. The thin film magnetic head according to claim 13, wherein
a position where a writing magnetic flux for recording that is radiated from a tip of the main pole by the writing magnetic field generation means reaches the magnetic recording medium that is a recording target is substantially the same as a position where a microwave radiated from the microwave radiator reaches the magnetic recording medium that is the recording target after being bent to the main pole side by the inclined surface.

16. The thin film magnetic head according to claim 13, wherein
the microwave radiator is provided separately from the writing magnetic field generation means, and is configured to radiate a microwave band resonant magnetic field by applying a microwave excitation current, the microwave band resonant magnetic field having a frequency equal to or close to a ferromagnetic resonant frequency $F_R$ of the magnetic recording medium that is the recording target.

17. The thin film magnetic head according to claim 13, wherein
the nonmagnetic dielectric layer is made of a material having a specific dielectric constant of 6 to 9.

18. The thin film magnetic head according to claim 13, wherein
the nonmagnetic dielectric layer is made of at least one substance selected from the group including alumina, beryllia, mullite, glass, silicon nitride, epoxy, and $SiO_2$.

19. The thin film magnetic head according to claim 13, wherein
- the auxiliary pole is positioned rearwardly relative to the main pole on the opposing medium surface,
- an underside position of the auxiliary pole is the same as a position where the auxiliary pole and nonmagnetic dielectric layer contact, and
- the auxiliary pole has no extra protruding portion.

20. A thin film magnetic head provided with a writing magnetic field generation means having a main pole, an auxiliary pole, and a coil wound between the main pole and the auxiliary pole, comprising:
- a microwave radiator provided between the main pole and auxiliary pole and in the vicinity of an opposing medium surface facing a magnetic recording medium that is a recording target; and
- a nonmagnetic dielectric layer filling a gap between the main pole and the auxiliary pole to embed the microwave radiator, wherein
- the nonmagnetic dielectric layer has an inclined surface at an end on a side of the opposing medium surface by which a microwave radiated from the microwave radiator is bent toward a side of the main pole, wherein
- a tip of the main pole, which is closer to the side of the recording medium, is slightly bent toward the auxiliary pole, and
- either a bending start point is at the same level as an underside of the microwave radiator, or the underside of the microwave radiator is positioned rearwardly relative to the bending start point.

21. The thin film magnetic head according to claim 20, wherein
- a position where a writing magnetic flux for recording that is radiated from a tip of the main pole by the writing magnetic field generation means reaches the magnetic recording medium that is a recording target is substantially the same as a position where a microwave radiated from the microwave radiator reaches the magnetic recording medium that is the recording target after being bent to the main pole side by the inclined surface.

22. The thin film magnetic head according to claim 20, wherein
- the microwave radiator is provided separately from the writing magnetic field generation means, and is configured to radiate a microwave band resonant magnetic field by applying a microwave excitation current, the microwave band resonant magnetic field having a frequency equal to or close to a ferromagnetic resonant frequency $F_R$ of the magnetic recording medium that is the recording target.

23. The thin film magnetic head according to claim 20, wherein
- the nonmagnetic dielectric layer is made of a material having a specific dielectric constant of 6 to 9.

24. The thin film magnetic head according to claim 20, wherein
- the nonmagnetic dielectric layer is made of at least one substance selected from the group including alumina, beryllia, mullite, glass, silicon nitride, epoxy, and $SiO_2$.

25. The thin film magnetic head according to claim 20, wherein
- the auxiliary pole is positioned rearwardly relative to the main pole on the opposing medium surface,
- an underside position of the auxiliary pole is the same as a position where the auxiliary pole and nonmagnetic dielectric layer contact, and
- the auxiliary pole has no extra protruding portion.

26. A head gimbal assembly comprising:
- the thin film magnetic head according to one of claims 1, 7 and 13-20;
- a slider configured to face a recording medium; and
- a suspension elastically supporting the slider.

27. A magnetic disk device comprising:
- a thin film magnetic head according to one of claims 1, 7 and 13-20;
- a slider configured to face a recording medium; and
- a positioning device supporting the slider and positioning the slider with respect to the recording medium.

* * * * *